(12) United States Patent
Golovashchenko

(10) Patent No.: US 7,810,366 B2
(45) Date of Patent: Oct. 12, 2010

(54) ELECTROHYDRAULIC TRIMMING, FLANGING, AND HEMMING OF BLANKS

(75) Inventor: Sergey Fedorovich Golovashchenko, Beverly Hills, MI (US)

(73) Assignee: ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 12/115,021

(22) Filed: May 5, 2008

(65) Prior Publication Data

US 2009/0272165 A1    Nov. 5, 2009

(51) Int. Cl.
*B21D 26/12* (2006.01)
*B21D 22/12* (2006.01)

(52) U.S. Cl. .................. 72/55; 72/56; 72/57; 72/60; 72/63; 72/700; 29/419.1; 29/421.1

(58) Field of Classification Search ............... 29/419.1, 29/421.1; 72/54, 55, 56, 57, 60, 61, 62, 63, 72/700
See application file for complete search history.

(56) References Cited

U.S. PATENT DOCUMENTS

| | | |
|---|---|---|
| 3,232,086 A | 2/1966 | Inoue |
| 3,248,917 A | 5/1966 | Herring, Jr. |
| 3,253,442 A | 5/1966 | Glove, Jr. et al. |
| 3,267,780 A | 8/1966 | Roth |
| 3,394,569 A | 7/1968 | Smith |
| 3,416,128 A | 12/1968 | Allen |
| 3,423,979 A | 1/1969 | Smith et al. |
| 3,486,062 A | 12/1969 | Schrom |
| 3,491,564 A | 1/1970 | Hundley et al. |
| 3,495,486 A | 2/1970 | Fuchs, Jr. |
| 3,512,384 A * | 5/1970 | Inoue ................. 29/421.1 |
| 3,553,434 A | 1/1971 | Murray |

(Continued)

FOREIGN PATENT DOCUMENTS

GB    1068440    5/1967

(Continued)

OTHER PUBLICATIONS

"Optimization of Initial Blank Shape Predicted Based on Inverse Finite Elelment Method", Science Direct, Finite Elements in Analysis and Design 43 (2007), pp. 218-233.

(Continued)

*Primary Examiner*—David B Jones
(74) *Attorney, Agent, or Firm*—Raymond L. Coppiellie; Brooks Kushman P.C.

(57) ABSTRACT

A method of electrohydraulically trimming a blank involving positioning a blank on a trimming member having a cutting edge such that a portion to be trimmed extends over the cutting edge and is in fluid communication with a chamber. Immobilize the blank with respect to the trimming member. Position a pair of electrodes in the chamber proximate the portion of the blank to be trimmed such that the electrodes and the trimming member are on opposite sides of the blank. Electrically connect the electrodes to a capacitor. Charge the capacitor. Fill the chamber with fluid to submerge the electrodes and to contact the portion of the blank to be trimmed. Discharge the capacitor across the electrodes to generate a pressure pulse that pushes the portion of the blank to be trimmed against the cutting edge thus trimming it off the blank.

18 Claims, 13 Drawing Sheets

U.S. PATENT DOCUMENTS

| | | | |
|---|---|---|---|
| 3,559,435 A | 2/1971 | Gerber | |
| 2,566,647 A | 3/1971 | Inoue | |
| 3,566,645 A | 3/1971 | Lemelson | |
| 3,572,072 A | 3/1971 | Hundley et al. | |
| 3,575,631 A | 4/1971 | Pratt | |
| 3,591,760 A | 7/1971 | Inoue | |
| 3,593,551 A | 7/1971 | Roth | |
| 3,603,127 A | 9/1971 | Seiffert et al. | |
| 3,611,765 A * | 10/1971 | Harvey | 72/55 |
| 3,631,699 A * | 1/1972 | Roth | 72/56 |
| 3,640,110 A | 2/1972 | Inoue | |
| 3,678,577 A * | 7/1972 | Weglin et al. | 72/55 |
| 3,742,746 A | 7/1973 | Erlandson | |
| 3,786,662 A | 1/1974 | Roth | |
| 3,814,892 A | 6/1974 | Inoue | |
| 3,894,925 A | 7/1975 | Inoue | |
| 4,030,329 A | 6/1977 | Chachin et al. | |
| 4,942,750 A | 7/1990 | Conaway | |
| 5,445,001 A | 8/1995 | Snavely | |
| 5,911,844 A | 6/1999 | Benedyk | |
| 5,948,185 A | 9/1999 | Krajewski et al. | |
| 6,033,499 A | 3/2000 | Mitra | |
| 6,094,809 A * | 8/2000 | Grassi | 29/419.2 |
| 6,178,796 B1 * | 1/2001 | Hellgren | 72/55 |
| 6,215,734 B1 | 4/2001 | Moeny et al. | |
| 6,227,023 B1 | 5/2001 | Daehn et al. | |
| 6,349,467 B1 | 2/2002 | Karafillis et al. | |
| 6,519,992 B1 | 2/2003 | Schnupp | |
| 6,591,649 B1 | 7/2003 | Gafri et al. | |
| 6,615,631 B2 | 9/2003 | Kleber et al. | |
| 6,708,542 B1 | 3/2004 | Gafri et al. | |
| 6,751,994 B2 * | 6/2004 | Horton et al. | 72/55 |
| 6,947,809 B2 | 9/2005 | Ren et al. | |
| 7,130,708 B2 | 10/2006 | Wang et al. | |
| 7,155,948 B2 * | 1/2007 | Hellgren | 72/55 |
| 7,165,429 B2 | 1/2007 | Steingroever | |
| 7,240,532 B2 | 7/2007 | Zhang et al. | |
| 7,266,982 B1 | 9/2007 | Guza | |
| 7,493,787 B2 * | 2/2009 | Golovashchenko et al. | 72/56 |
| 2005/0113722 A1 | 5/2005 | Schultheiss | |
| 2005/0199032 A1 | 9/2005 | Krajewski | |
| 2006/0201229 A1 | 9/2006 | Zhu et al. | |

FOREIGN PATENT DOCUMENTS

| | | |
|---|---|---|
| GB | 1095276 | 12/1967 |
| GB | 1165902 | 10/1969 |
| GB | 1241343 | 8/1971 |
| GB | 1244922 | 9/1971 |
| GB | 1250901 | 10/1971 |
| GB | 1252997 | 11/1971 |
| GB | 1262072 | 2/1972 |
| GB | 1294240 | 10/1972 |
| RU | 2158644 | 11/2000 |

OTHER PUBLICATIONS

"General Motors' Quick Plastic Forming Process", James G. Schroth, TMS (The Minerals, Metals & Materials Society), 2004, pp. 9-20.

FY 2005 Progress Report, Automotive Lightweighting Materials, pp. 136-140.

"Demonstration of the Preform Anneal Process to Form a One-Piece Aluminum Door Inner Panel", Lee et al., SAE Technical Paper Series, No. 2006-01-0987, 2006 SAE World Congress, Detroit, MI, Apr. 3-6, 2006.

"Retrogression Heat Treatments in AA6111" Paul E. Krajewski, General Motors R&D Center, Materials and Processing Laboratory, Oct. 23, 2002.

"Metal Forming with Capacitor Discharge Electro-Spark", E.C. Schrom, Paper SP62-80, published in Advanced High Energy Rate forming. Book II, ASTME, 1962.

"Research in Electric Discharge Forming Metals", R.L. Kegg et al., Paper SP62-78, published in Advanced High Energy Rate Forming, Book II, ASTME, 1962.

"Formability of Sheet Metal with Pulsed Electromagnetic and Electrohydraulic Technologies", S.F. Golovashchenko, et al., Proceedings of TMS Symposium "Aluminum-2003", San Diego, CA 2003.

"The Effect of Tool/Sheet Interaction in Damage Evolution of Electromagnetic Forming of Aluminum Alloy Sheet", J. Imbert et al, Transactions ASME, Journal of Engineering Materials and Technology, Jan. 2005, vol. 127, pp. 145-153.

"Equipment and Technological Processes with the Employment of Electrohydraulic Effect" G.A. Guliy, et al., Moscow: Mechanical Engineering, 1977.

"Electrohydraulic Effect and Some Potential Applications", L.A. Yutkin, St. Petersburg, 1959.

Concurred: Project Leader of MSTC Project N 1593—Mar. 31, 2003 "Technical Report on Scientific Research Project: Development of the Technology of Static-Electrohydropulsed Drawing on the Punch of Parts of Boxed Shape", Town of Sarov, 2003.

"Heat Treating, Cleaning and Finishing", Metals Handbook, 8th Ed., vol. 2, Amer.Soc.for Metals, pp. 277-278, printed 1976.

"Plants That Have Tough Metals and Large Parts To Form Watch Cautiously As . . . High Velocity Takes Off Again", J. E. Sanford, Iron Age Technical Features, Mar. 4, 1969, vol. 203, pp. 91-95.

* cited by examiner

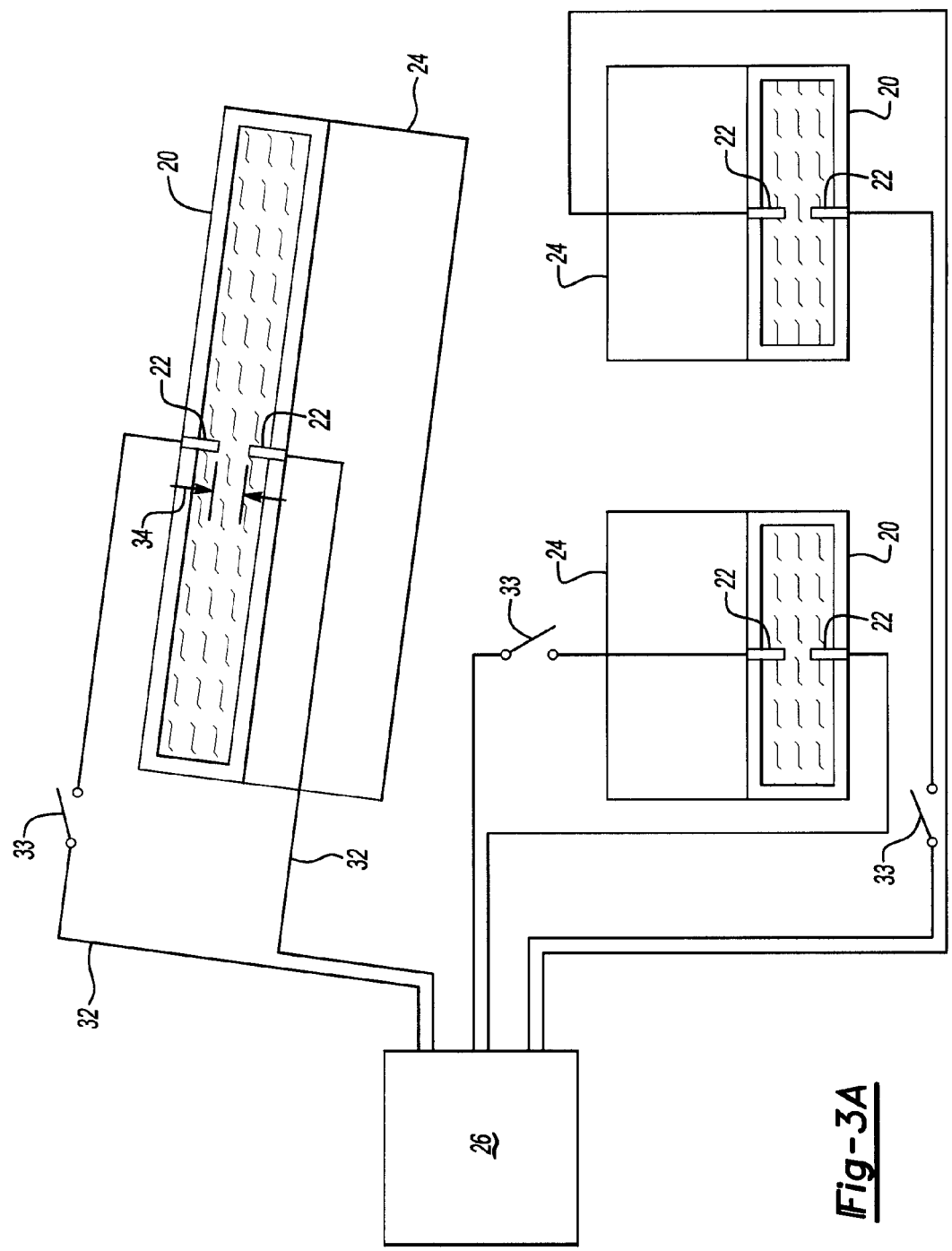

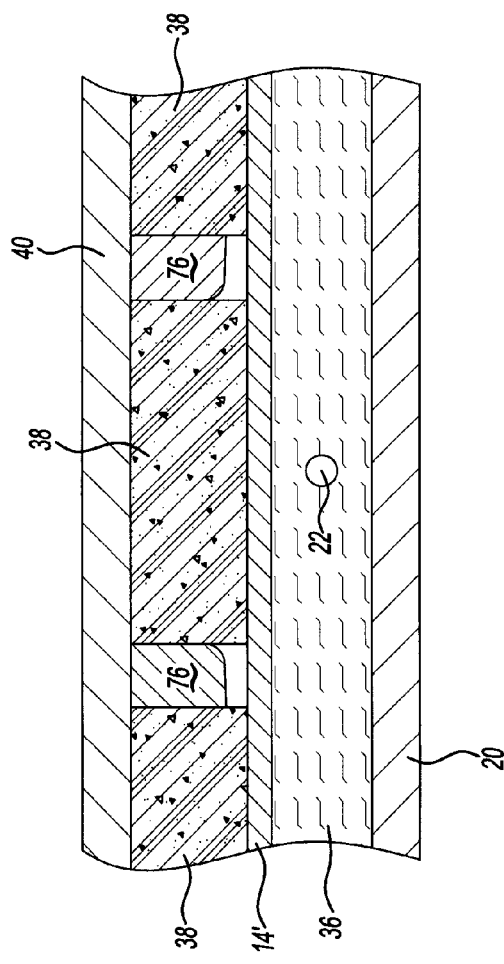
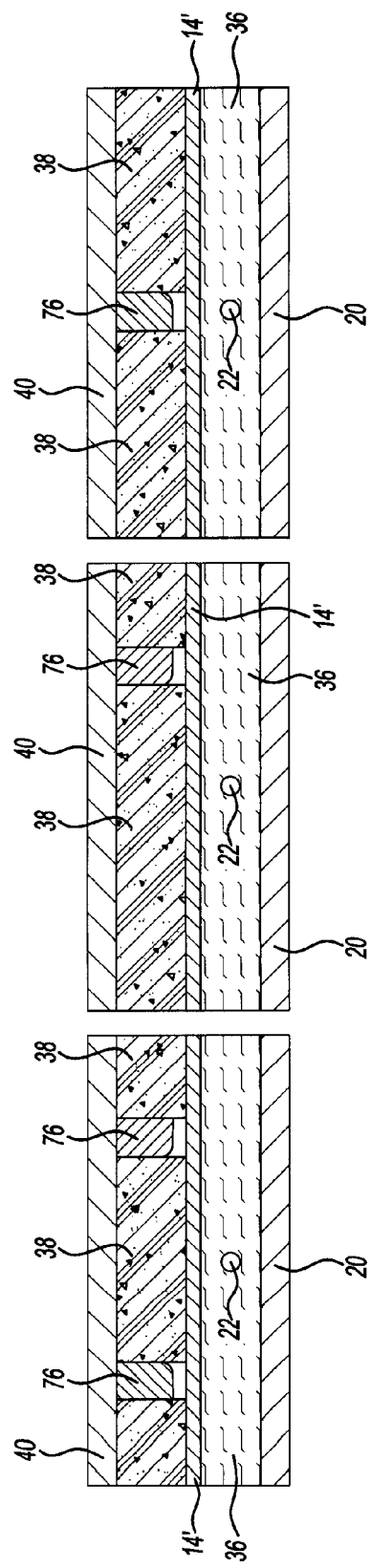

ELECTROHYDRAULIC TRIMMING, FLANGING, AND HEMMING OF BLANKS

BACKGROUND

1. Inventive Field

The embodiments disclosed herein relates to electrohydraulically trimming, flanging, and hemming blanks such as, but not limited to, stamped automotive body panels.

2. Background Art

The trimming of sheet metal parts in industry is well known. Modern production utilizes a wide variety of materials for interior panels, exterior panels, and structural parts such as Deep Drawing Quality Steels, Drawing Quality Steels, Bakehardenable Steels, Dual Phase Steels, Boron Steels and Aluminum Alloys. The process of trimming is the shearing off of extra material from a drawn panel. The process of flanging involves bending a portion of the blank, typically an end portion, at an angle with respect to the remainder of the blank. The process of hemming involves joining a plurality of panels, typically two panels, by positioning the panels adjacent one another and then folding an end portion of one panel over an end portion of the other panel.

Trimming dies usually incorporate a sharp upper trim steel, a sharp lower trim steel, and a clamping pad. Many high strength steels require large forces to be applied by trimming dies. Typically, to accomplish a good quality trimmed surface, the clearance between the shearing edges should be below 10% of the material thickness. High mechanical loads on the die may result in its insufficient stiffness, especially for high strength materials which can result in the opening of the clearance between the shearing edges during the trimming process. This can result in burrs on the stamped part. Additionally, use of conventional dies to trim high strength panels can result in rapid or excessive die wear and specifically increased wear of the trimming edges which need to be sharp. The embodiments disclosed herein addresses these and other problems.

SUMMARY

A method of electrohydraulically trimming, flanging and hemming a blank is disclosed herein. In one example, the method includes the following steps. Provide a capacitor, a pair of electrodes, a trimming member having a cutting edge, a chamber and a blank having a portion to be trimmed. Position the blank on the trimming member such that the portion to be trimmed extends over the cutting edge and is disposed in fluid communication with the chamber. Clamp the blank to the trimming member to substantially immobilize the blank. Position the pair of electrodes within the chamber proximate to the portion of the blank to be trimmed and positioned such that the pair of electrodes and the trimming member are on opposite sides of the blank. Electrically connect the electrodes to the capacitor. Charge the capacitor. Fill the chamber with an amount of fluid that is sufficient to submerge the electrodes and to contact the portion of the blank to be trimmed. Discharge the capacitor across the electrodes to cause an electric discharge into the fluid to generate a pressure pulse that is transmitted by the fluid to the portion of the blank to be trimmed whereby the portion of the blank to be trimmed is pushed against the cutting edge of the trimming member and trimmed off of the blank.

In one implementation of the first example, the method further comprises providing an elastic pad and positioning the elastic pad substantially adjacent the portion of the blank to be trimmed such that the electrodes and the elastic pad are on opposite sides of the portion of the blank to be trimmed.

In another implementation of the first example, a plurality of capacitors are provided. The plurality of capacitors are electrically connected to the electrodes. The plurality of capacitors are discharged substantially simultaneously across the electrodes.

In another implementation of the first example, at least one scrap cutter is provided. The scrap cutter is aligned with the portion to be trimmed. The pressure pulse pushes the portion be trimmed against the at least one scrap cutter and the at least one scrap cutter shears the portion to be trimmed into a plurality of segments.

In another implementation of the first example, the method further comprises positioning an elastic pad between the cutting edge and the dull edge. The capacitor is discharged across the electrodes and the portion to be flanged is pushed against the cutting edge, the dull edge and the elastic pad. As a result, the portion to be flanged is trimmed. The elastic pad is then removed and the capacitor is discharged a second time across the electrodes to push the portion to be flanged against the dull edge of the trimming member. The portion to be flanged is then bent around the dull edge to form a flange.

In another implementation of the first example, the method further comprises the following steps. Provide a plurality of the capacitors, a plurality of the chambers, a plurality of the pairs of electrodes, a plurality of the trimming members and a blank having a plurality of portions to be trimmed. Position the blank on the plurality of trimming members such that each of the portions to be trimmed extends over the cutting edge of a respective one of the trimming members and such that each of the portions to be trimmed is disposed in fluid communication with a respective one of the chambers. Clamp the blank to the plurality of trimming members to substantially immobilize the blank. Position a respective one pair of electrodes within each respective chamber. Each pair of electrodes may be disposed proximate the respective portion of the blank to be trimmed and positioned such that each of the pairs of electrodes and each respective trimming member are on opposite sides of the blank. Electrically connect each of the pairs of electrodes to the capacitors. Charge the capacitors. Fill each chamber with an amount of fluid that is sufficient to submerge each pair of electrodes and to contact each portion of the blank to be trimmed. Discharge the capacitors across each of the pairs of electrodes to cause an electric discharge into the fluid within each chamber to generate a pressure pulse that is transmitted by the fluid to the respective portion of the blank to be trimmed. The portion of the blank to be trimmed is pushed against the cutting edge of each respective trimming member and is trimmed off of the blank.

In a variation of the preceding implementation, the method further comprises providing a plurality of elastic pads and positioning each elastic pad substantially adjacent a respective one of the portions of the blank to be trimmed such that each respective pair of electrodes and each respective elastic pad are on opposite sides of the respective portion of the blank to be trimmed. In another variation, the step of electrically connecting each of the pairs of electrodes to the capacitors includes connecting each pair of electrodes to a respective one of the capacitors. The capacitors may be discharged into each respective chamber either substantially simultaneously or sequentially, as desired.

In another implementation of the first example, the fluid comprises water.

In another implementation of the first example, the method further comprises positioning the fluid below each respective portion of the blank to be trimmed.

In a second example, the method comprises the following steps. Provide a capacitor, a pair of electrodes, a trimming member having a cutting edge and a dull edge spaced apart from the cutting edge, a chamber and a blank having a portion to be trimmed and a portion to be flanged. Position the blank on the trimming member such that the portion to be trimmed extends over the cutting edge and such that the portion to be flanged is disposed between the cutting edge and the dull edge and further disposed in fluid communication with the chamber. Clamp the blank to the trimming member to substantially immobilize the blank. Position the pair of electrodes within the chamber proximate to the portion of the blank to be flanged and positioned such that the pair of electrodes and the trimming member are on opposite sides of the blank. Electrically connect the electrodes to the capacitor. Charge the capacitor. Fill the chamber with an amount of fluid that is sufficient to submerge the electrodes and to contact the portion of the blank to be flanged. Discharge the capacitor across the electrodes to cause an electric discharge into the fluid to generate a pressure pulse that is transmitted by the fluid to the portion of the blank to be flanged. The portion of the blank to be flanged is pushed against the cutting edge and the dull edge of the trimming member. The portion to be trimmed off of the blank is severed by the cutting edge and the portion to be flanged is bent around the dull edge to form a flange.

In an implementation of the second example, the fluid comprises water.

In another implementation of the second example, discharging the capacitor across the electrodes further includes discharging electric energy between 5 to 50 kJ.

In a third example, the method includes the following steps. Providing a capacitor, a pair of electrodes, a first blank, a second blank having a flange, and a chamber having an upper section and a lower section, the lower section having a cavity for receiving a fluid. Position the first blank adjacent to the second blank such that an end of the first blank aligns with the flange of the second blank to form a loose assembly of blanks. Position the loose assembly of blanks on the lower section of the chamber such that the flange is in fluid communication with the cavity. Position the pair of electrodes within the cavity of the lower section of the chamber. Add an amount of fluid that is sufficient to submerge the pair of electrodes. Clamp the upper section of the chamber to the lower section of the chamber to substantially immobilize the loose assembly of blanks between the upper section and the lower section of the chamber. Electrically connect the pair of electrodes to the capacitor or the group of capacitors. Charge the capacitor. Discharge the capacitor across the electrodes to cause an electric discharge into the fluid to generate a pressure pulse that is transmitted by the fluid to the flange whereby the flange is folded over the first blank.

In an implementation of the third example, the method further comprises the following steps. Provide a sealing member. Position the sealing member on the lower section of the chamber. Position the loose assembly of blanks on the sealing member whereby a watertight seal may be obtained when the upper section of the chamber is clamped to the lower section of the chamber.

In another implementation of the third example, the step of adding an amount of fluid to the chamber further comprises filling the chamber to a level that does not reach the loose assembly of blanks.

In another implementation of the third example, the method further comprises the following steps. Providing a plurality of the pairs of electrodes. Position the pairs of electrodes throughout the chamber. Connect each pair of electrodes to the capacitor. Discharge the capacitor across each pair of electrodes to cause a plurality of electric discharges into the fluid to generate a plurality of pressure pulses that are transmitted by the fluid to the flange whereby the flange is folded over the first blank.

In another implementation of the third example, the step of positioning the loose assembly of blanks on the lower section of the chamber further comprises orienting the loose assembly of blanks at a non-parallel angle with respect to a surface of the fluid.

BRIEF DESCRIPTION OF THE DRAWINGS

The description herein makes reference to the accompanying drawing wherein like reference numerals refer to like parts through the several views, and in which:

FIG. 3A is a plan view illustrating a plurality of chambers, each chamber being equipped with a pair of electrodes and a capacitor electrically connected to each of the electrodes;

FIG. 17 illustrates a fragmentary cross-sectional view of an arrangement including a scrap cutter for cutting a portion of the blank illustrated in FIG. 15 into a segment; and FIG. 18 is a cross-sectional view illustrating a plurality of discrete arrangements for cutting a portion of the blank illustrated in FIG. 15 into segments.

DETAILED DESCRIPTION OF THE PREFERRED EMBODIMENT(S)

Figure 1:
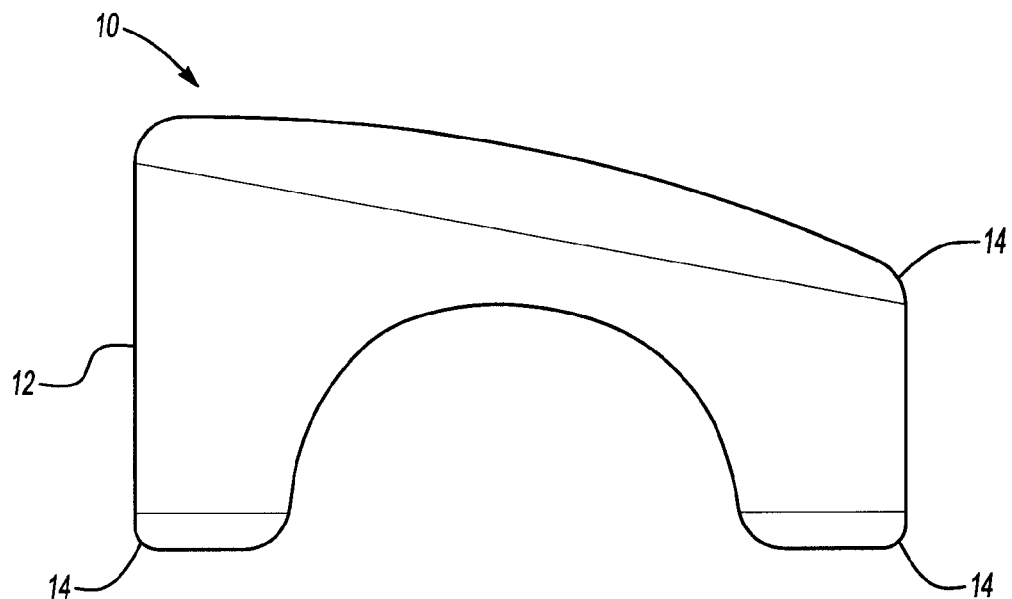
FIG. 1 illustrates a plan view of a stamped panel having portions to be trimmed.

Detailed embodiments are disclosed herein; however, it is to be understood that the disclosed embodiments are merely exemplary embodiments that take various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ embodiments of the invention.

Examples of the method disclosed herein permit the electrohydraulic trimming of a blank or stamped panel by positioning a portion of the blank that is to be trimmed adjacent a sharp edge or cutting edge of a trimming member. The blank is clamped to the trimming member to render it substantially immobile therewith. A quantity of fluid is positioned adjacent the portion of the blank to be trimmed such that the fluid contacts with the portion to be trimmed. The contact need not be direct contact. For instance, the teachings disclosed herein are equally applicable to arrangements where there is a membrane or other structure disposed between the fluid and the blank, providing that the membrane or other structure does not prevent the pressure pulse from acting on the blank with sufficient force to sever the portion to be trimmed.

Electrodes are positioned within the fluid proximate the portion of the blank to be trimmed and connected to at least one capacitor. When the capacitor is discharged, electricity arcs between the electrodes causing a pressure wave to propagate through the fluid. If the amount of electricity discharged by the capacitor is sufficiently high, the pressure wave will be sufficiently strong to push the portion of the blank that is to be trimmed against the cutting edge of the trimming member with sufficient force to shear it off. The discharge occurs at an extremely rapid rate, in some embodiments not exceeding 1 millisecond. The amount of electricity discharged across the electrodes may range from 5 to 50 kJ.

In other examples of the method, the blank may not only be trimmed, but may also be flanged. The trimming member may include both a cutting edge and a dull edge that is spaced apart from the cutting edge. The blank is positioned on the trimming member such that the portion to be flanged extends between the cutting edge and the dull edge. The fluid in the chamber contacts the portion to be flanged. When the capacitor discharges, the pressure pulse drives the portion to be flanged against both the cutting edge and the dull edge. The cutting edge shears off a portion of the blank while the dull edge permits the portion to be flanged to bend and form a flange.

In other examples, the blank may have multiple portions to be trimmed and through the use of multiple trimming members, and in some cases multiple capacitors, the entire panel may be trimmed at once rather than trimming, repositioning the panel, and repeating the process. These and other examples will be addressed in greater detail below with reference to various figures illustrating the various steps of the methods disclosed herein.

With reference to FIG. 1, a blank 10 is depicted in plan view. Blank 10 has a main body portion 12 and a plurality of portions to be trimmed 14. At the conclusion of the trimming process, portions to be trimmed 14 will be severed from main body portion 12. In the illustrated embodiment, blank 10 is in the general shape of a front quarter panel for a motor vehicle. It should be understood by those of ordinary skill in the art that the teachings disclosed herein are applicable not only to automotive applications, but to any application where the trimming of metal blanks is necessary and/or useful. For instance, and without limitation, the teachings disclosed herein may have applications in the manufacture of aircraft, water craft, spacecraft and other types of land craft, such as rail-driven vehicles, etc. Additionally, the teachings disclosed herein are not limited to use with the manufacture of vehicles, but may also be used in any industry involving the manufacture of any structure or article of manufacture made from metal panels or panels made from other materials.

Figure 2:
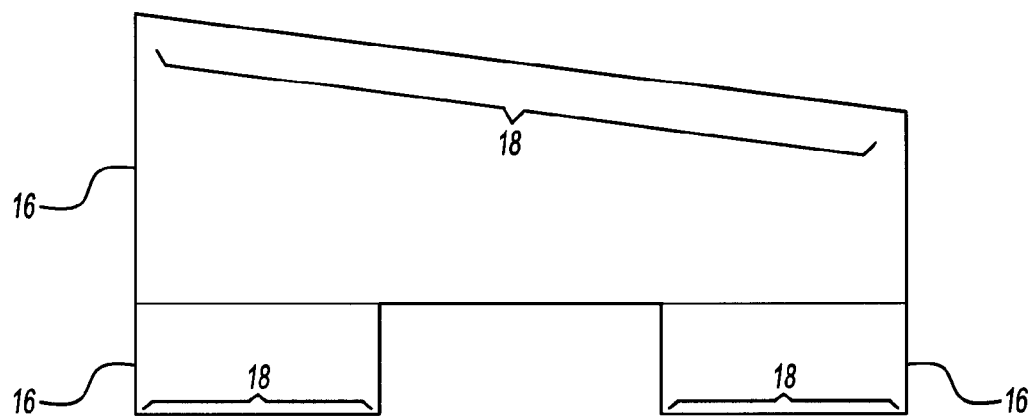
FIG. 2 illustrates a plan view of a plurality of trimming members positioned to trim the panel of FIG. 1.

With respect to FIG. 2, a plurality of trimming members 16 are depicted in plan view. In some embodiments, trimming members 16 may form a draw die. Trimming members 16 may take any desirable shape and, in the illustrated embodiment, each trimming member 16 has a cutting edge or sharp edge 18 that is positioned to correspond with the portions 14 to be trimmed from main body portion 12. When the blank is pressed against trimming members 16 with sufficient force, cutting edges 18 will shear off portions 14 to be trimmed. In the illustrated embodiment, each cutting edge 18 is substantially straight. It should be understood by those of ordinary skill that cutting edge 18 may take any desirable shape including circular or arcuate shapes. Additionally, other embodiments may have a single trimming member 16 with a plurality of cutting edges 18 arranged to correspond with the portions 14 to be trimmed from main body portion 12. When main body portion 12 is disposed adjacent (typically above or below) trimming members 16, the portions to be trimmed will align with cutting edges 18.

With respect to FIG. 3A, a plurality of chambers 20 are illustrated. Chambers 20 will hold a fluid and are arranged to generally correspond with the portions 14 to be trimmed off main body portion 12. Each chamber 20 includes a pair of electrodes 22. In other embodiments, rather than having a plurality of individual chambers 20, a single narrow chamber 20 (not shown) having the same general shape as a periphery of blank 10 may be used. Such a chamber 20 may include a plurality of electrodes disposed at desirable intervals throughout the chamber.

In accordance with various examples of the method disclosed herein, main body portion 12 is positioned over or partially in chambers 20 such that each portion 14 to be trimmed is positioned over a respective one of the chambers 20. Trimming members 16 are positioned above main body portion 12 such that a cutting edge of each trimming member 16 is aligned with a portion 14 to be trimmed.

Each chamber 20 is at least partially filled with a fluid, in some embodiments, water. Enough fluid is added to each chamber 20 to submerge each pair of electrodes 22 and to contact the portion 14 to be trimmed. A clamping member 24 is included within or adjacent to each chamber 20 to press blank 10 against trimming members 16 to substantially immobilize blank 10 therewith. In some embodiments, chambers 22 are watertight and are made from materials including, but not limited to, cold rolled steel.

Trimming members 16 may be made from any suitable materials including, but not limited to, tool, steel, or iron. Clamping members 24 may be made of any suitable material including, but not limited to, cold rolled steel.

Figure 3B:
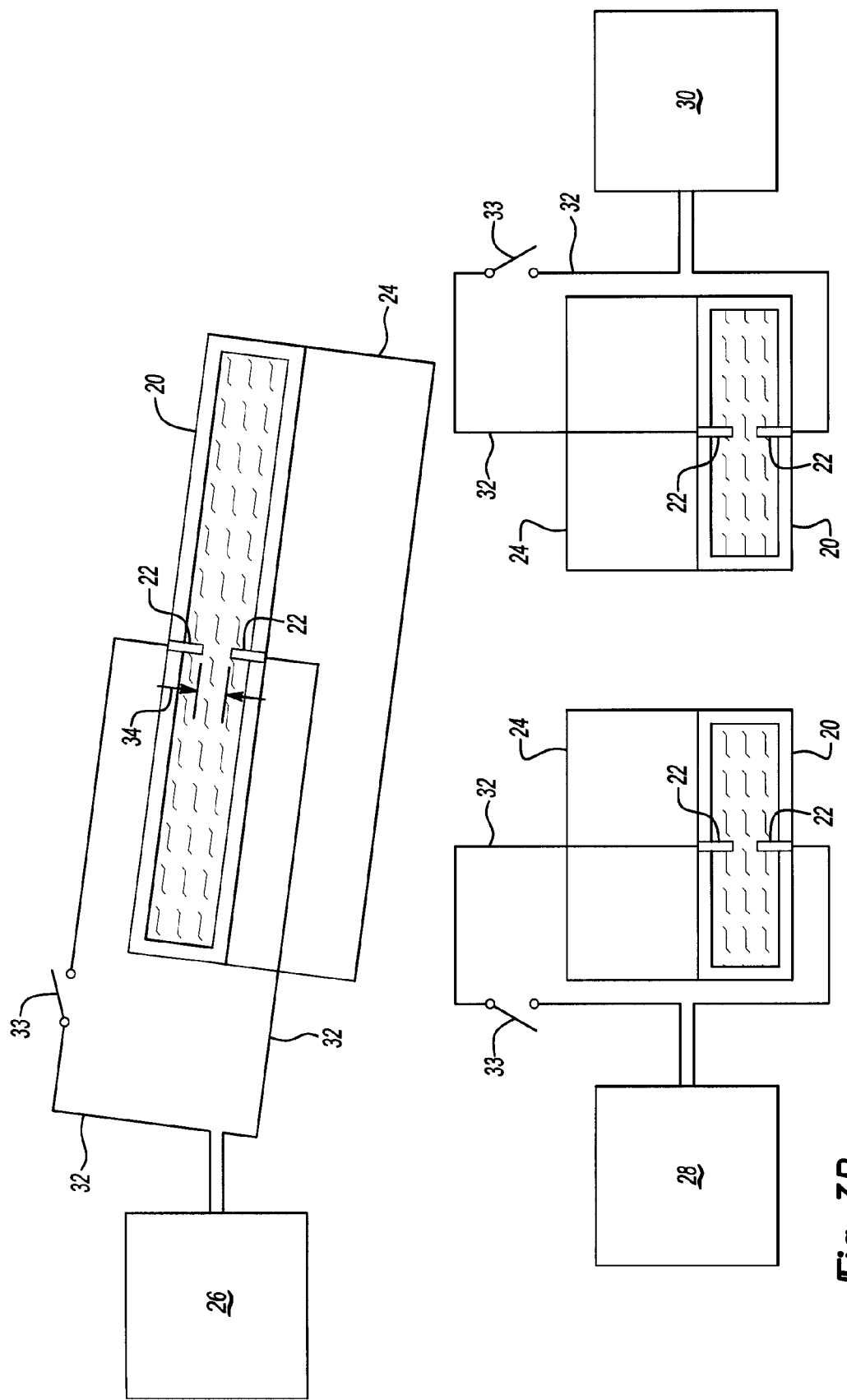
FIG. 3B is an alternate embodiment of the arrangement illustrated in FIG. 3A with a plurality of capacitors connected to a respective one pair of electrodes.

Capacitor 26 (which may alternatively be a plurality of capacitors) is electrically connected to a charging transformer (not shown) and also to each pair of electrodes through wires 32. Each pair of wires 32 connecting capacitor 26 to a respective pair of electrodes 22 includes a switch 33 for opening and closing a circuit thereby permitting the discharge of capacitor 26 across the pairs of electrodes 22. Switches 33 permit the coordinated discharge of capacitor 26 as desired. An alternate embodiment is illustrated in FIG. 3B wherein each pair of electrodes 22 are connected to a respective one capacitor 26, 28 and 30 which may permit a substantially simultaneous discharge of the capacitors, a coordinated sequential discharge of the capacitors or a discharge in any other desirable coordinated manner.

With respect to FIG. 3A, when capacitor 26 is discharged, a relatively large amount of electricity may be very rapidly discharged across one of the pairs of electrodes 22. For instance, in some examples, electrical energy of between 5 and 50 kJ may be stored in capacitors 26, 28 and 30 and discharged through electrodes 22 in a very short span of time, usually 1 millisecond or less. As electricity travels across the pair of electrodes 22, electricity arcs across a gap 34 between each electrode. As the electricity arcs, it creates a very high pressure pulse that travels very rapidly through the fluid. In this manner, the high pressure is transmitted to the portions 14 to be trimmed which are thrust back against the cutting edge 18 of their respective trimming members 16 with great force, sufficient to shear portions 14 to be trimmed off main body portion 12. The electric discharge occurs so quickly that all of the force and momentum generated by the pressure pulse traveling through the fluid is imparted to the blank, in some cases, before the blank even has a chance to begin moving in response to the pulse. In this manner, the shearing of the portions 14 to be trimmed is not dependent upon hydrostatic pressure because the momentum has been transferred to the portions 14 to be trimmed before it begins to move and/or deform.

Figure 4:
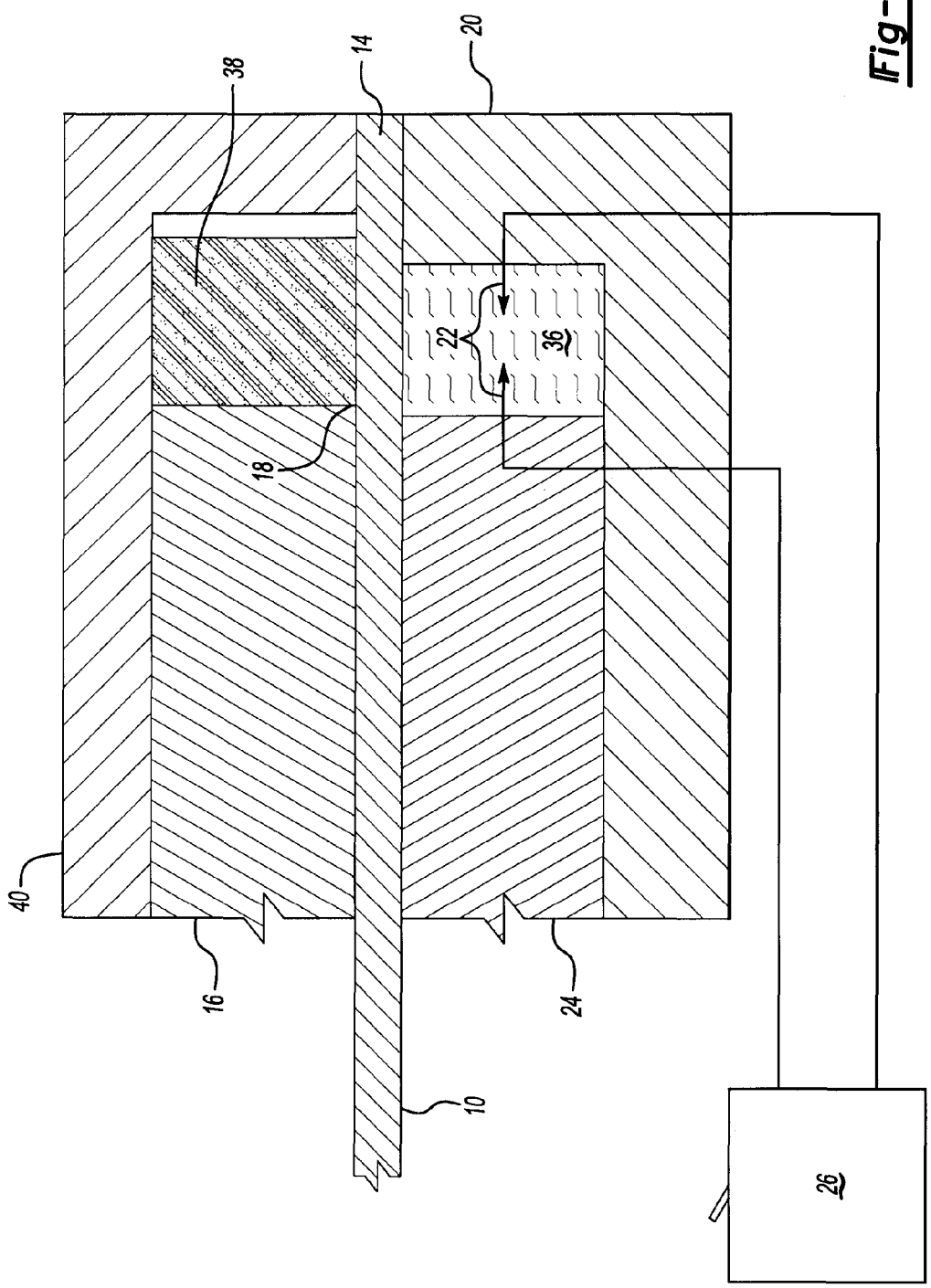
FIG. 4 is a schematic cross-sectional view illustrating a portion of the panel of FIG. 1 positioned between one of the trimming members of FIG. 2 and one of the chambers of FIG. 3B.

With respect to FIG. 4, a schematic cross-sectional view illustrating a portion of blank 10 is illustrated. Blank 10 is positioned above clamping member 24, above fluid 36 and above chamber 20. Trimming member 16 is disposed above blank 10 such that cutting edge 18 is aligned with an end of portion 14. An elastic pad 38 is disposed above portion 14 proximate trimming member 16. Elastic pad 38 is made of a deformable material including, but not limited to, polyurethane, or rubber or any other mechanical support such as springs, to name a few. Elastic pad 38 "catches" portion 14 as the pressure pulse drives it against cutting edge 18 and severs it. An upper chamber portion 40 is disposed above trimming member 16 and elastic pad 38 and extends downward to meet blank 10. Upper chamber portion 40 may serve to clamp an end of portion 14 and also to contain any fluid expelled from chamber 20 during the discharge of capacitor 26. A pair of electrodes 22 are schematically represented and electrically connected to capacitor 26. Although the arrangement illustrated in FIG. 4 has clamping member 24 and fluid 36 disposed below blank 10 and trimming member 16 and elastic pad 38 disposed above blank 10, it should be understood that any desirable orientation of these components may be employed.

Figure 5:
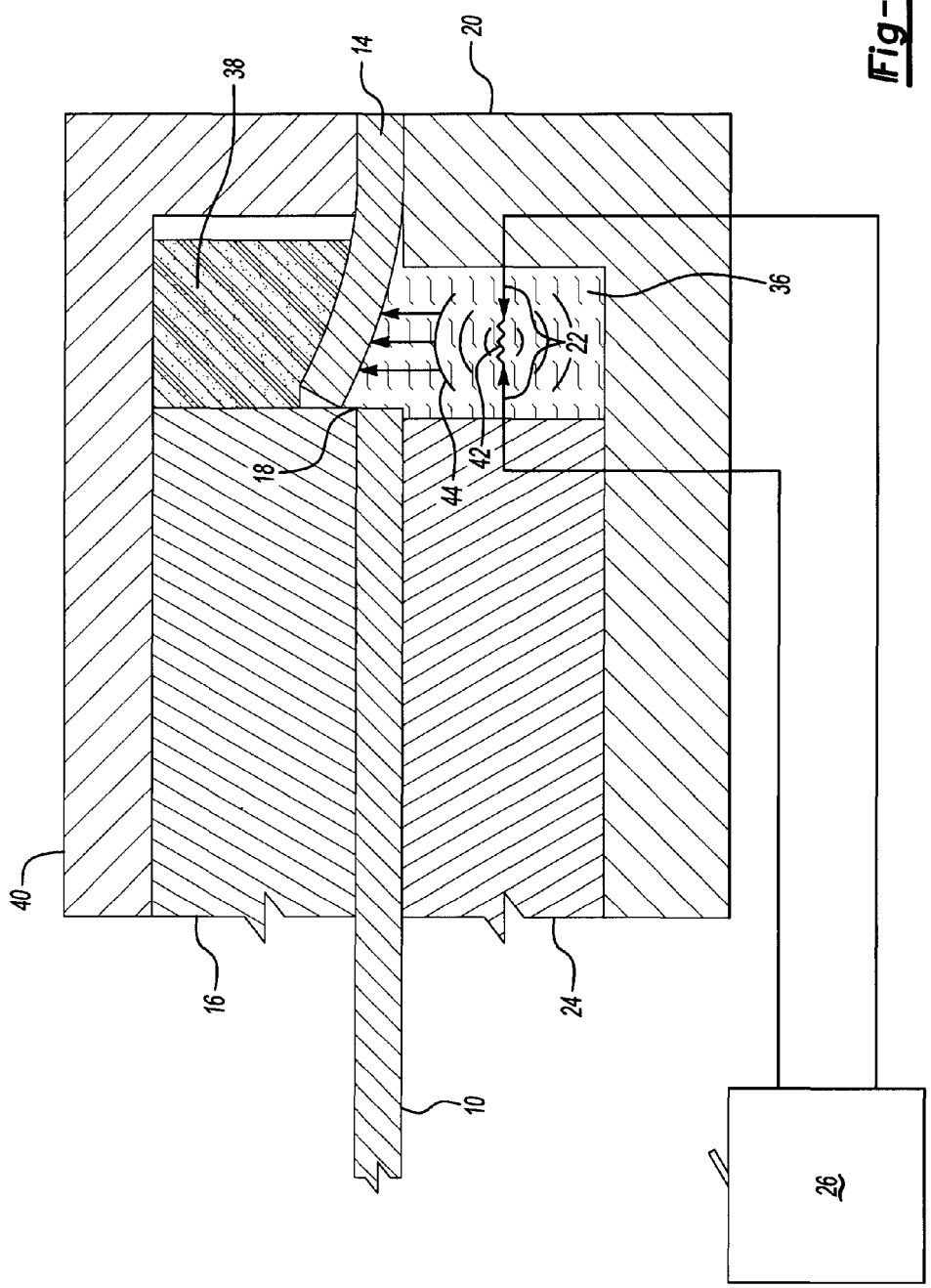
FIG. 5 is a schematic cross-sectional view illustrating the arrangement of FIG. 4 after the capacitor has been discharged.

With respect to FIG. 5, the arrangement of FIG. 4 is depicted as capacitor 26 is discharged. A substantial amount of electric energy, for example between 5 and 50 kJ, is discharged across pair of electrodes 22 causing an electric arc 42 to jump across gap 34 between the electrodes. This causes pressure pulse 44 to propagate through fluid 36 in all directions. Portion to be trimmed 14 is thrust upwardly against cutting edge 18 and elastic pad 38. Elastic pad 38 deforms allowing portion 14 to continue moving in an upward direction. Trimming member 16 has only insubstantial deformation and, accordingly, cutting edge 18 shears portion 14 off of blank 10, thus trimming blank 10.

Figure 15:
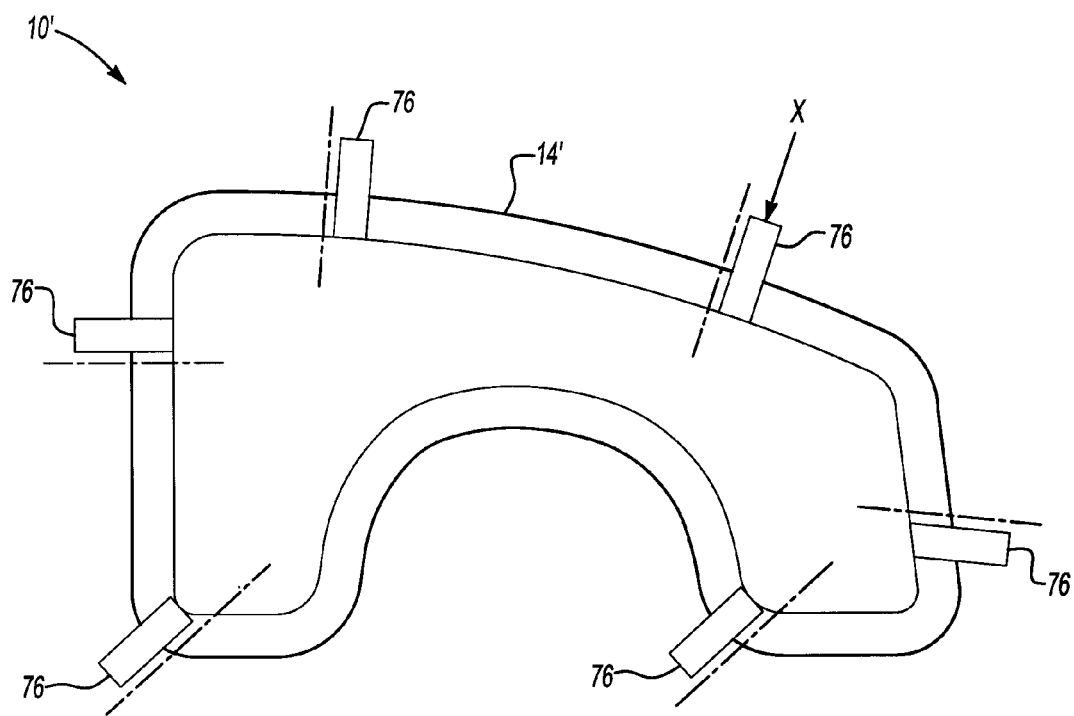
FIG. 15 illustrates a plan view of an alternate embodiment of the stamped panel illustrated in FIG. 1 having a single portion to be trimmed disposed around a periphery of the panel.

An alternate embodiment of blank 10 is illustrated in FIG. 15 as blank 10'. Rather than including a plurality of portions to be trimmed as in FIG. 1, in FIG. 15, blank 10' includes a single portion to be trimmed 14' disposed around the entire periphery of blank 10'. If blank 10' were trimmed in the manner described above, portion to be trimmed 14' would comprise a single contiguous and potentially unwieldy piece of scrap. To facilitate the removal of portion to be trimmed 14', a plurality of scrap cutters 76 are disposed along portion to be trimmed 14' such that upon discharge of capacitor 26, portion to be trimmed 14' is not only severed from main body portion 12', but is also cut into a plurality of segments by scrap cutters 76. Scrap cutters 76 may be aligned along portion to be trimmed 14' while trimming member 16 (not shown) may be aligned along main body portion 12'. Each scrap cutter 76 may be disposed adjacent to a periphery of main body portion 12'.

Figure 16:
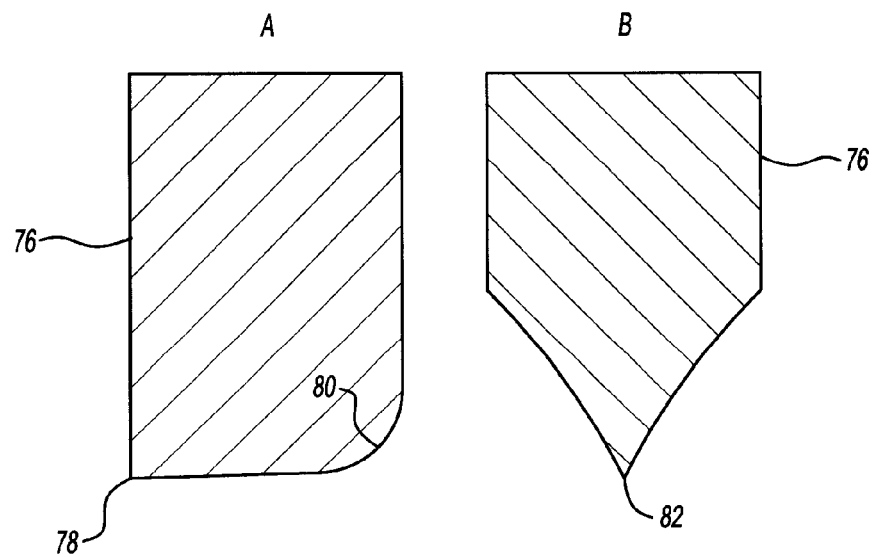
FIG. 16 is a cross-sectional view illustrating cross sections of alternate embodiments of scrap cutters illustrated in FIG. 15.

FIG. 16 illustrates two possible profiles of scrap cutter 76 viewed from the perspective of arrow X in FIG. 15. Scrap cutter 76 identified by the reference letter A in FIG. 16 includes a cutting edge 78 and a rounded edge 80. Cutting edge 78 provides a substantially rigid, sharp surface against which portion to be trimmed 14' is sheared. Rounded edge 80 lacks a radius necessary to shear or cut portion to be trimmed 14' and thus may bend portion to be trimmed 14', but will not cut it. Scrap cutter 76 identified by reference letter B in FIG. 16 includes a cutting edge 82 which is disposed along an approximate centerline of scrap cutter 76. Other configurations are possible.

FIG. 17 illustrates a fragmentary, cross-section view illustrating an arrangement capable of cutting portion to be trimmed 14' into a segment for easy removal from the die. In some embodiments, the fragmentary section depicted in FIG. 17 may be taken from a chamber having the same general shape as the periphery of the blank to be trimmed. Chamber 20 is illustrated as a bottom most portion and serves to contain fluid 36 in a localized area proximate portion to be trimmed 14'. Pair of electrodes 22 is disposed within fluid 36. Portion to be trimmed 14' is disposed above fluid 36 and in contact therewith. Elastic pad 38 is disposed above portion to be trimmed 14' for the purpose of "catching" the various segments of portion to be trimmed 14' as portion to be trimmed 14' is thrust upwards against scrap cutters 76. Upper chamber portion 40 is disposed above elastic pad 38 and scrap cutters 76 and holds elastic pad 38 and scrap cutter 76 firmly in place. Once capacitor 26 (not shown) is discharged across pair of electrodes 22, an arc transmitted through fluid 36 causes a pressure pulse to expand outwardly in all directions from electrodes 22 which drive portion to be trimmed 14☐ upwards against scrap cutters 76 resulting in the shearing of portion to be trimmed 76 into a plurality of discrete segments.

With respect to FIG. 18, an alternate embodiment of the arrangement illustrated in FIG. 17 is depicted. Whereas the arrangement of FIG. 17 is a segment of a larger chamber whose design and shape mimics the shape of the portion to be trimmed 14', FIG. 18 depicts a plurality of arrangements that may be assembled about the periphery of blank 10' and arranged to take the shape of the periphery of blank 10'. As many chambers as desired or needed may be arranged adjacent one another to accommodate the full periphery of portion to be trimmed 14'.

Figure 6:
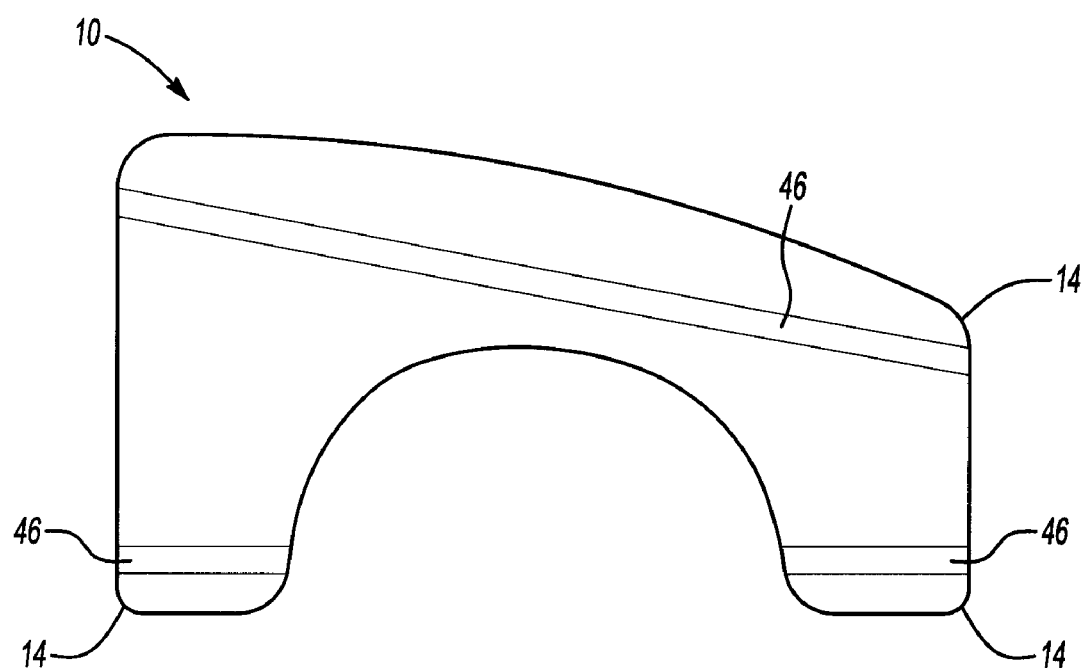
FIG. 6 is a plan view of a panel having a plurality of portions to be trimmed and a plurality of portions to be flanged.

With respect to FIG. 6, blank 10 is depicted having a plurality of portions to be trimmed 14 and a plurality of portions to be flanged 46.

Figure 7:
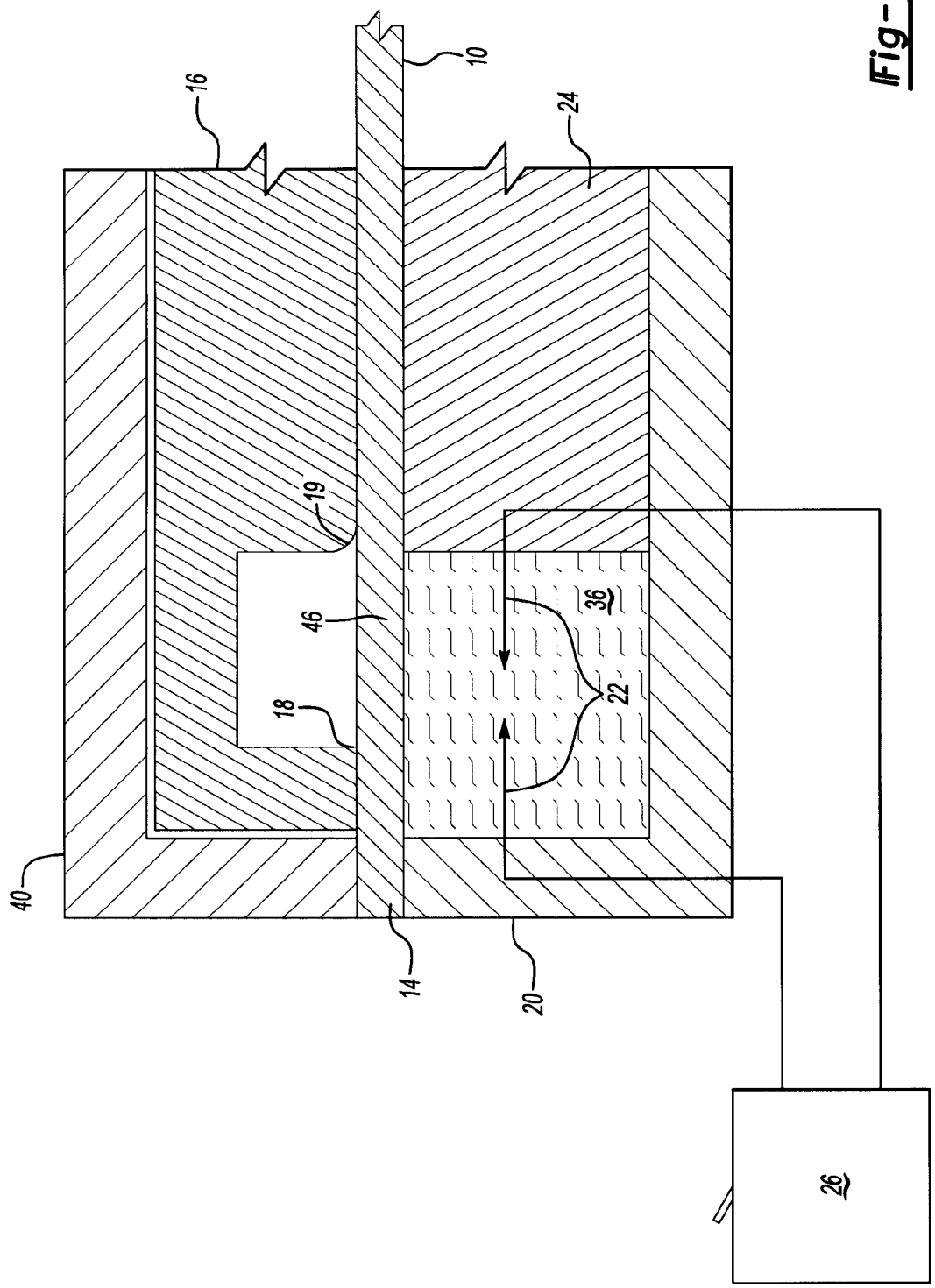
FIG. 7 is a schematic cross-sectional view of the panel of FIG. 6 disposed between a chamber of FIG. 3B and a trimming member configured to trim and flange the panel.

With respect to FIG. 7, a schematic cross-sectional view is depicted similar to the view of FIG. 4. Blank 10 is positioned above chamber 20, above fluid 36 and above clamping member 24 and below trimming member 16. In this embodiment, however, trimming member 16 includes a cutting edge 18 and a rounded or dull edge 19. Dull edge 19 is spaced apart from cutting edge 18 such that a void is disposed above portion to be flanged 46.

Figure 8:
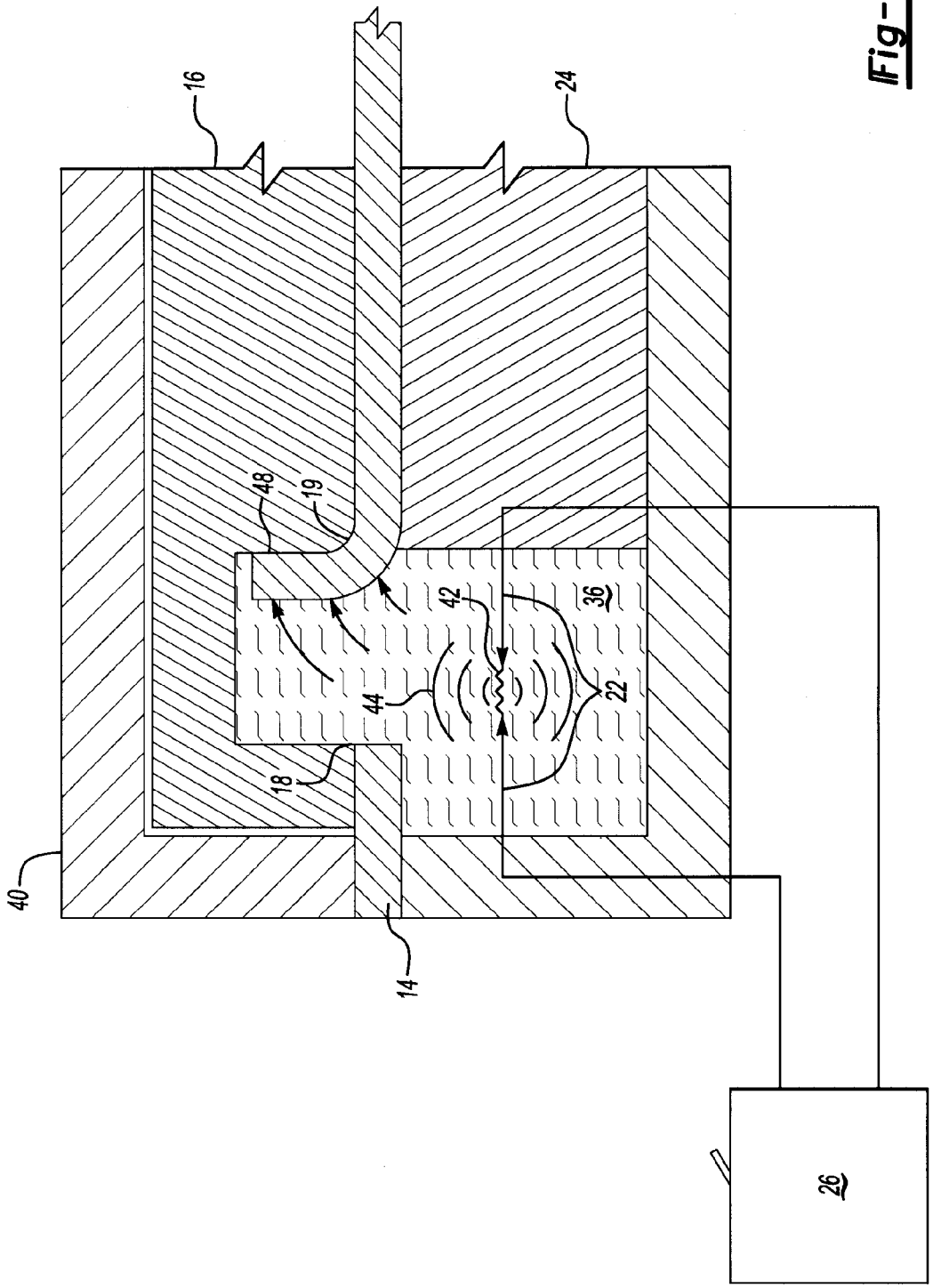
FIG. 8 is a schematic cross-sectional view illustrating the arrangement of FIG. 7 after the capacitor has been discharged.

With respect to FIG. 8, the arrangement of FIG. 7 is depicted as capacitor 26 is discharged. Electricity flows from capacitor 26 into pair of electrodes 22 causing electric arc 42 to extend across gap 34. Pressure pulse 44 propagates outwardly from electric arc 42 through fluid 36 driving portion to be flanged 46 upward. An end of the portion to be flanged 46 is driven upward into cutting edge 18 and is sheared off of the portion to be trimmed 14. Dull edge 19 does not shear portion to be flanged. Rather, dull edge 19 serves as a guide for the bending of portion 46 causing it to be bend in a clockwise direction with respect to FIG. 8. Dull edge 19 may have any desirable radius, but not smaller than about 0.1 mm. Portion 46 will continue to bend in a clockwise direction until it is obstructed from further bending motion by wall 48 of trimming member 16. In this manner, blank 10 is trimmed and flanged.

In other embodiments, the trimming and flanging of portion to be trimmed 14 may not occur simultaneously, but rather, may be sequential. For instance, in some embodiments, the void above portion to be flanged 46 (see FIG. 7) may, in a first a stage, include an elastic pad 38 similar to that illustrated in FIGS. 4 and 5. During a trimming step, capacitor 26 may be discharged across electrodes 22 causing portion to be flanged 46 to be thrust upwardly against cutting edge 18 while elastic pad 38 (not shown) obstructs portion to be flanged 46 and prevents it from bending around dull edge 19. In a second step, elastic pad 38 may be removed and capacitor 26 may again be discharged across electrodes 22 creating pressure pulse 44 which drives portion to be flanged 46 in an upward direction thus bending around dull edge 19 to form a flange.

FIGS. 9 through 14 illustrate application of the above principals to a process for hemming panels together as well as illustrating various embodiments of the equipment used for doing so. With respect to FIG. 9, a chamber 50 is illustrated including a lower section 52 and an upper section 54. Lower section 52 includes a cavity 56 for containing a quantity of fluid 58. A pair of electrodes 22 are disposed within cavity 56 and positioned proximate to one another to permit electricity to arc from one electrode to the other when the capacitor (not shown) is discharged. Upper section 54 is configured to engage lower section 52 and to close off cavity 56 to form a substantially watertight chamber.

A loose assembly of blanks 60, comprising an outer blank 62 disposed adjacent an inner blank 64, is disposed between upper and lower sections 52, 54 such that a flange 66 on outer blank 62 protrudes within chamber 50. In the illustrated embodiment, a die ring 68 is disposed between loose assembly 60 and lower section 52. In other embodiments, an additional die ring 68 may be disposed between upper section 54 and loose assembly 60. Die ring 68 may be shaped and configured to conform to the contours of loose assembly 60, and in particular, to outer blank 62 to ensure a watertight arrangement when upper section 54 is lowered onto lower section 52. Die ring 68 may be made of materials comprising cold rolled steel. Fluid 58 comprises water. In other embodiments, fluid 58 may comprise water with anti-rusting additives. As illustrated an amount of fluid 58 has been introduced into cavity 56 to submerge a pair of electrodes 22. A surface of fluid 58 rises to just below flange 66. In other embodiments, the level of fluid 58 may be lower or higher, as desired. An air pocket 70 formed by a cavity portion defined in a lower portion of upper section 54 and the surface of fluid 58 provides space into which fluid 58 may move when dislodged by the pressure pulse caused by the discharge of the capacitor (not shown). Air pocket 70 extends to an area behind flange 66. This allows flange 66 to bend backwards over inner panel 64 without obstruction.

Figure 9:
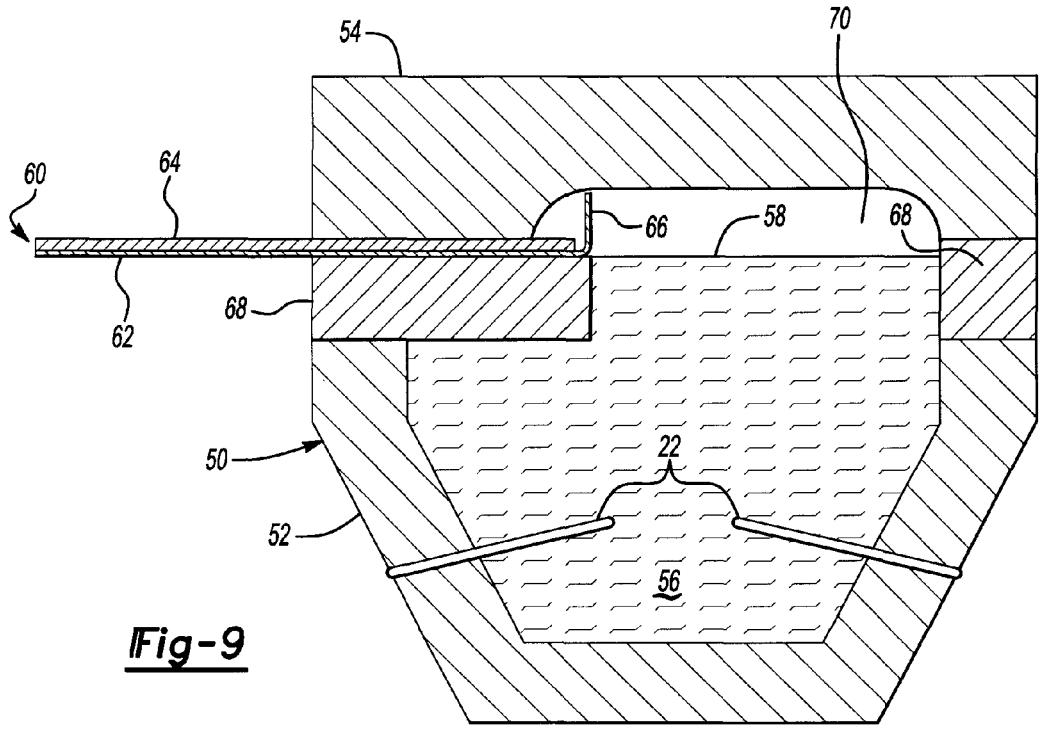
FIG. 9 is a schematic cross-sectional view illustrating a loose assembly of panels disposed between upper and lower sections of a chamber prior to hemming.
Figure 10:
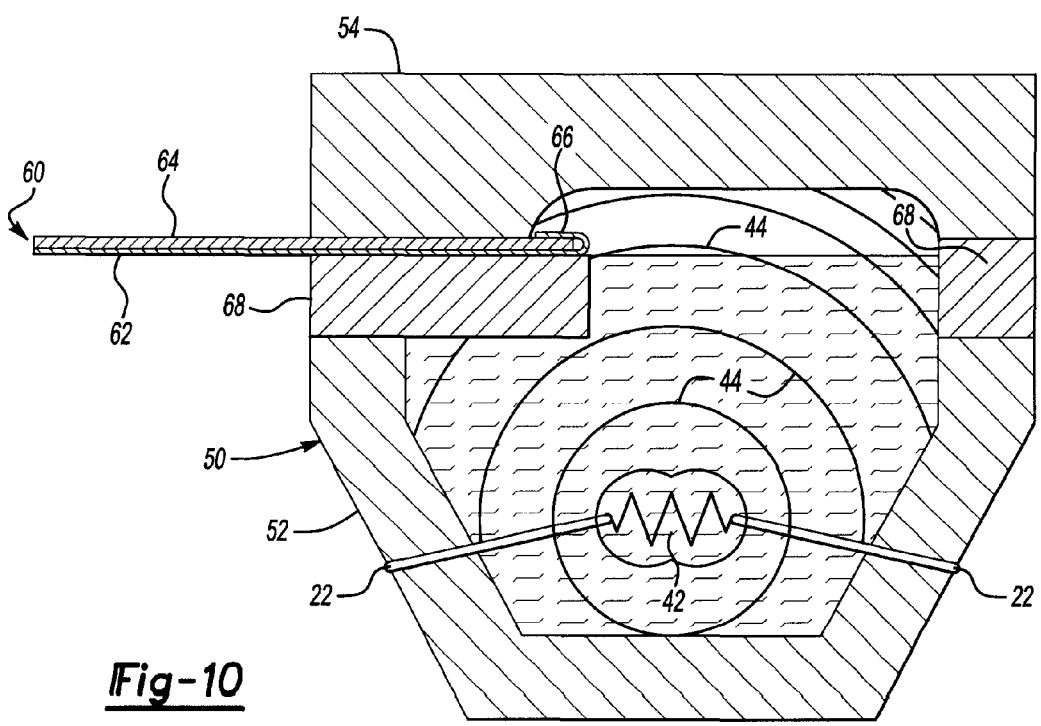
FIG. 10 is a schematic cross-sectional view illustrating the arrangement of FIG. 9 after the capacitor has been discharged.

With respect to FIG. 10, the arrangement of FIG. 9 is illustrated as the capacitor is discharged. When between 5 and 50 kJ of electric energy are discharged across pair of electrodes 22, an electric arc 42 forms and creates a pressure pulse 44 that propagates through fluid 58 driving fluid 58 upwards into air pocket 70. Because upper and lower sections 52, 54 of chamber 50 are substantially watertight, the contours of the chamber drive the fluid up against flange 66 and pressure pulse 44 is thereby transmitted to flange 66. The transfer of energy via pressure pulse 44 is exceedingly rapid and typically all of the momentum imparted by pressure pulse 44 is delivered to flange 66 before flange 66 begins to react and fold backwards over inner panel 64. Upper section 54 may be retracted and inner and outer blanks 64, 62, now rigidly held together by a hem, may now be removed from chamber 50.

Figure 11:
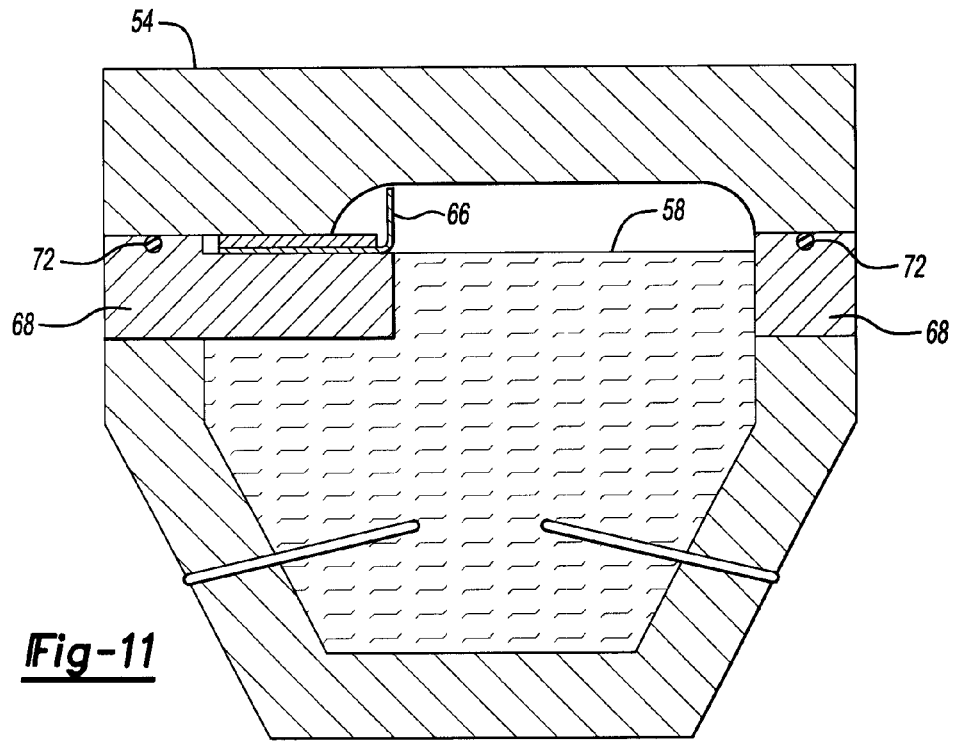
FIGS. 11-14 are schematic cross-sectional views illustrating alternate embodiments of the arrangement illustrated in FIG. 9.

With respect to FIG. 11, an alternate embodiment of the arrangement depicted in FIG. 9 is illustrated. In FIG. 11, die ring 68 includes a sealing ring 72 which facilitates the forming of a watertight arrangement between upper section 54 and a die ring 68. Sealing ring 72 may be made from materials including rubber and polyurethane, copper or steel, to name a few.

Figure 12:
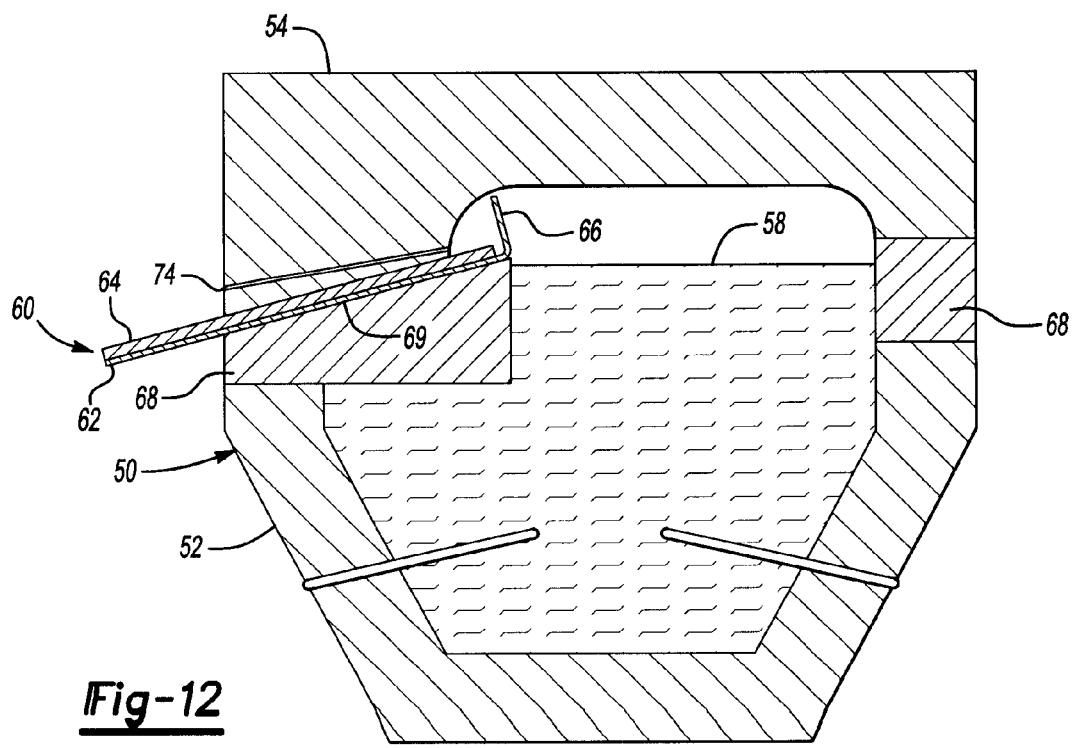

With respect to FIG. 12, another alternate embodiment of the arrangement illustrated in FIG. 9 is depicted. In the arrangement depicted in FIG. 12, die ring 68 has a contoured upper surface 69 which permits loose assembly 60 to be disposed on lower section 52 at an angle with respect to a surface of fluid 58. Disposing loose assembly 60 at such an angle may facilitate the hemming process by concentrating the force applied by pressure pulse 44 as it strikes flange 66. Other angles may be employed as desired.

Additionally, upper section 54 includes a fluid evacuation channel 74 to permit any fluid accumulating "downhill" of flange 66 to evacuate chamber 50. This may ensure that flange 66 is not obstructed by any accumulated fluid as flange 66 falls over inner blank 64.

Figure 13:
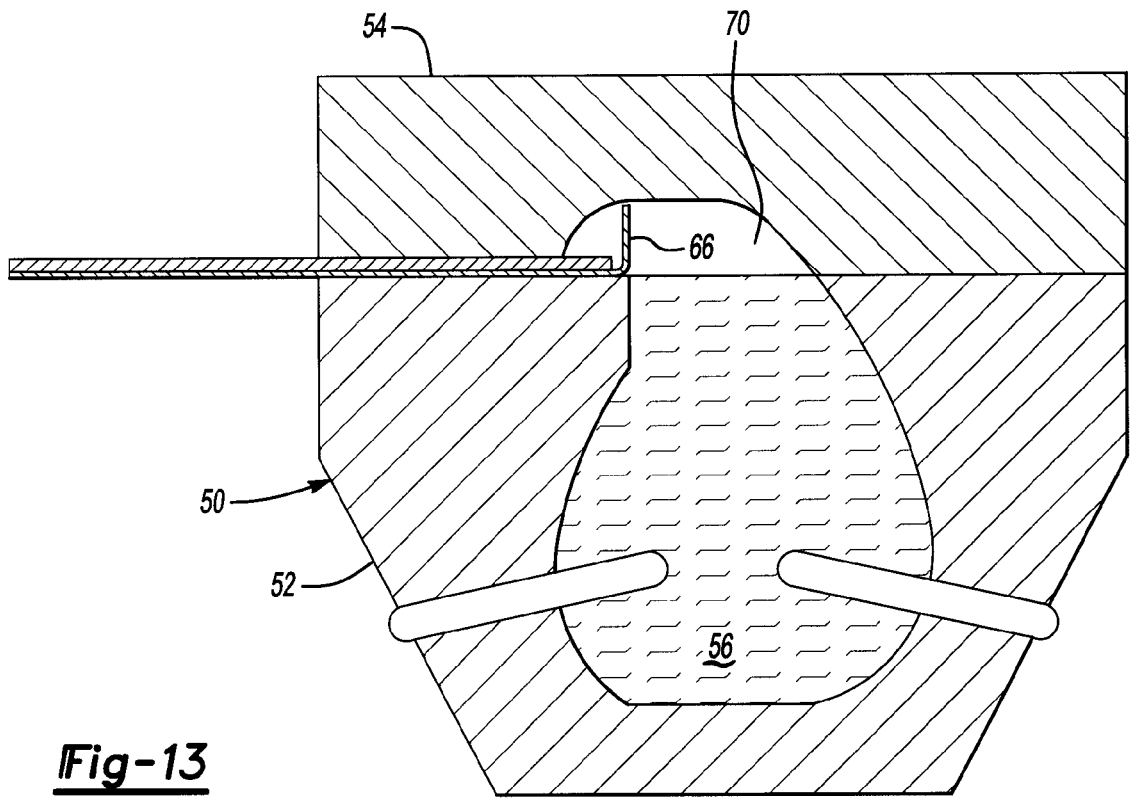
Figure 14:
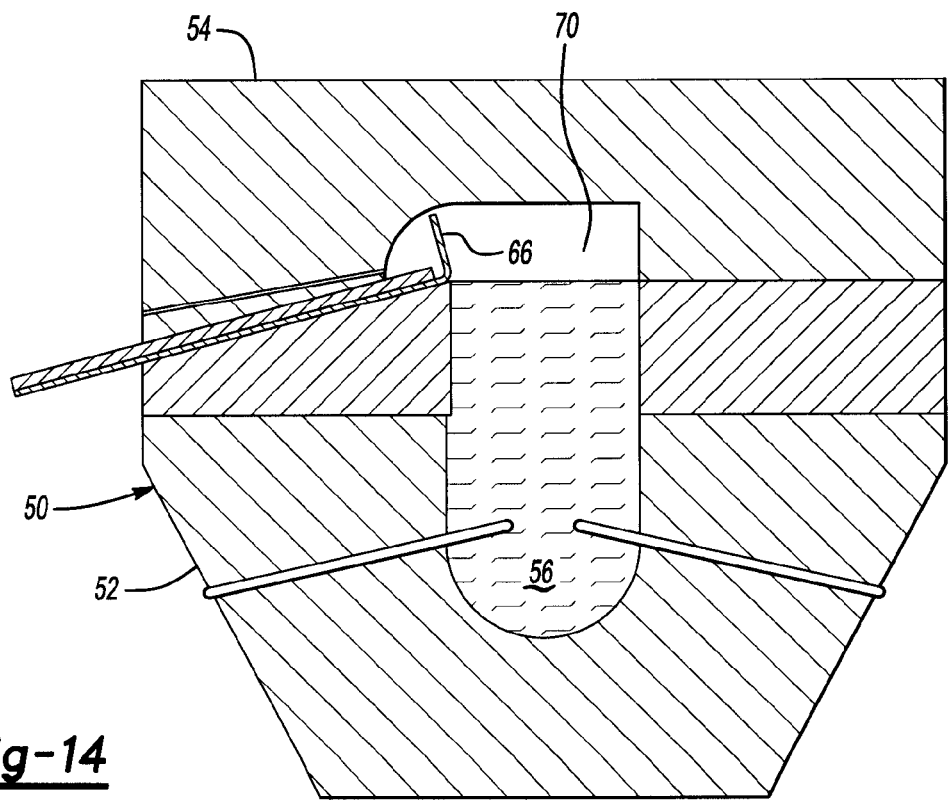

FIGS. 13 and 14 illustrate embodiments of chamber 50 wherein lower section 52 has differently contoured cavities 56 which may direct pressure pulse 44 against flange 66 in a focused manner. Upper section 54 may include a cavity for forming air pocket 70 that conforms to cavity 56 and facilitates the transmittal of pressure pulse 44.

While the best mode has been described in detail, those familiar with the art to which this invention relates will recognize various alternative designs and embodiments as defined by the following claims.

What is claimed:
1. A method of trimming a blank, the method comprising:
   positioning a blank adjacent a trimming member having a cutting edge;
   immobilizing the blank;
   positioning a fluid filled chamber adjacent the blank opposite the trimming member;
   discharging a capacitor across a pair of electrodes into the fluid to generate a pressure pulse that pushes the blank against the cutting edge thereby trimming off a portion of the blank; and providing an elastic pad and positioning the elastic pad substantially adjacent the portion of the blank to be trimmed such that the electrodes and the elastic pad are on opposite sides of the portion of the blank to be trimmed.

2. The method of claim 1 wherein a plurality of the capacitors are provided, wherein the plurality of the capacitors are electrically connected to the electrodes, and wherein the plurality of capacitors are discharged substantially simultaneously across the electrodes.

3. The method of claim 1 further comprising providing at least one scrap cutter and aligning the at least one scrap cutter with the portion to be trimmed whereby the pressure pulse pushes the portion to be trimmed against the at least one scrap cutter and whereby the at least one scrap cutter shears the portion to be trimmed into a plurality of segments.

4. The method of claim 1 wherein the fluid comprises water.

5. A method of trimming a blank, the method comprising:
positioning a blank adjacent a trimming member having a cutting edge;
immobilizing the blank;
positioning a fluid filled chamber adjacent the blank opposite the trimming member;
discharging a capacitor across a pair of electrodes into the fluid to generate a pressure pulse that pushes the blank against the cutting edge thereby trimming off a portion of the blank; and providing an elastic pad and positioning the elastic pad substantially adjacent the portion of the blank to be trimmed such that the electrodes and the elastic pad are on opposite sides of the portion of the blank to be trimmed;
providing a plurality of the capacitors, a plurality of the chambers, a plurality of the pairs of electrodes, a plurality of the trimming members, and a blank having a plurality of portions to be trimmed;
positioning the blank on the plurality of trimming members such that each of the portions to be trimmed extends over the cutting edge of a respective one of the trimming members and such that each of the portions to be trimmed is disposed in fluid communication with a respective one of the chambers;
clamping the blank to the plurality of trimming members to substantially immobilize the blank;
positioning a respective one pair of electrodes within each respective chamber, each pair of electrodes being disposed proximate the respective portion of the blank to be trimmed and positioned such that each of the pairs of electrodes and each respective trimming member are on opposite sides of the blank;
electrically connecting each of the pairs of electrodes to the capacitors;
charging the capacitors;
filling each chamber with an amount of fluid sufficient to submerge each pair of electrodes and to contact each portion of the blank to be trimmed; and
discharging the capacitors across each of the pairs of electrodes to cause an electric discharge into the fluid within each chamber to generate a pressure pulse that is transmitted by the fluid to the respective portion of the blank to be trimmed, whereby the portion of the blank to be trimmed is pushed against the cutting edge of each respective trimming member and trimmed off of the blank.

6. The method of claim 5 further comprising providing a plurality of elastic pads and positioning each elastic pad substantially adjacent a respective one of the portions of the blank to be trimmed such that each respective pair of electrodes and each respective elastic pad are on opposite sides of the respective portion of the blank to be trimmed.

7. The method of claim 5 wherein the step of electrically connecting each of the pairs of electrodes to the capacitors includes connecting each pair of electrodes to a respective one of the capacitors.

8. The method of claim 7 further comprises discharging each of the capacitors into each respective chamber substantially simultaneously.

9. The method of claim 7 further comprises discharging each of the capacitors sequentially into each respective chamber.

10. A method of electrohydraulically trimming and flanging a blank, the method comprising:
providing a capacitor, a pair of electrodes, a trimming member having a cutting edge and a dull edge spaced apart from the cutting edge, a chamber and a blank having a portion to be trimmed and a portion to be flanged;
positioning the blank on the trimming member such that the portion to be trimmed extends over the cutting edge and such that the portion to be flanged is disposed between the cutting edge and the dull edge and further disposed in fluid communication with the chamber;
clamping the blank to the trimming member to substantially immobilize the blank;
positioning the pair of electrodes within the chamber proximate the portion of the blank to be flanged and positioned such that the pair of electrodes and the trimming member are on opposite sides of the blank;
electrically connecting the electrodes to the capacitor;
charging the capacitor;
filling the chamber with an amount of fluid sufficient to submerge the electrodes and to contact the portion of the blank to be flanged;
discharging the capacitor across the electrodes to cause an electric discharge into the fluid to generate a pressure pulse that is transmitted by the fluid to the portion of the blank to be flanged, whereby the portion of the blank to be flanged is pushed against both the cutting edge and the dull edge of the trimming member, whereby the portion to be trimmed off of the blank is severed by the cutting edge, and whereby the portion to be flanged is bent around the dull edge to form a flange.

11. The method of claim 10 wherein the fluid comprises water.

12. The method of claim 10 wherein discharging the capacitor across the electrodes further includes discharging electric energy between 5 to 50 kJ.

13. The method of claim 10 further comprising positioning an elastic pad between the cutting edge and the dull edge, discharging the capacitor across the electrodes to push the portion to be flanged against the cutting edge, the dull edge, and the elastic pad thereby trimming the portion to be flanged, then removing the elastic pad and discharging the capacitor across the electrodes a second time to push the portion to be flanged against the dull edge of the trimming member whereby the portion to be flanged is bent around the dull edge to form a flange.

14. A method of electrohydraulically hemming a plurality of blanks, the method comprising:
providing a capacitor, a pair of electrodes, a first blank, a second blank having a flange and a chamber having an upper section and a lower section, the lower section having a cavity for receiving a fluid;

positioning the first blank adjacent the second blank such that an end of the first blank aligns with the flange of the second blank to form a loose assembly of blanks;

positioning the loose assembly of blanks on the lower section of the chamber such that the flange is in fluid communication with the cavity;

positioning the pair of electrodes within the cavity of the lower section of the chamber;

adding an amount of fluid sufficient to submerge the pair of electrodes;

clamping the upper section of the chamber to the lower section of the chamber to substantially immobilize the loose assembly of blanks between the upper section and the lower section of the chamber;

electrically connecting the pair of electrodes to the capacitor;

charging the capacitor;

discharging the capacitor across the electrodes to cause an electric discharge into the fluid to generate a pressure pulse that is transmitted by the fluid to the flange, whereby the flange is folded over the first blank.

15. The method of claim 14 further comprising providing a sealing member;

positioning the sealing member on the lower section of the chamber; and positioning the loose assembly of blanks on the sealing member whereby a watertight seal may be obtained when the upper section of the chamber is clamped to the lower section of the chamber.

16. The method of claim 14 wherein the step of adding an amount of fluid to the chamber further comprises filling the chamber to a level that does not reach the loose assembly of blanks.

17. The method of claim 14 further comprising:

providing a plurality of the pairs of electrodes;

positioning the pairs of electrodes throughout the chamber;

connecting each pair of electrodes to the capacitor;

discharging the capacitor across each pair of electrodes to cause a plurality of electric discharges into the fluid to generate a plurality of pressure pulses that are transmitted by the fluid to the flange, whereby the flange is folded over the first blank.

18. The method of claim 14 wherein the step of positioning the loose assembly of blanks on the lower section of the chamber further comprises orienting the loose assembly of blanks at a non-parallel angle with respect to a surface of the fluid.

* * * * *